United States Patent Office 2,834,785
Patented May 13, 1958

2,834,785

N-SUBSTITUTED-3-THIOL PIPERIDINES AND THIOESTERS THEREOF

John H. Biel, Milwaukee, Wis., assignor to Lakeside Laboratories, Inc., a corporation of Wisconsin No Drawing. Application November 16, 1954
Serial No. 469,312

18 Claims. (Cl. 260—293.4)

This invention relates to sulfur compounds. Particularly, this invention is concerned with novel thiol compounds and thioesters thereof. It is also concerned with salts of such compounds and novel processes of producing such compounds and salts.

According to the present invention novel N-substituted-3-thiol piperidines, thioesters and salts thereof are provided of the formula

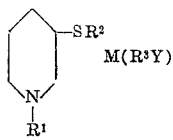

wherein $R^1$ is an alkyl or aralkyl group, $R^2$ is hydrogen or an acyl group derived from a carboxylic acid, $R^3$ is hydrogen or alkyl, Y is a nontoxic anion and M is 1 or less.

These novel compounds may be produced by the process which comprises reacting an N-substituted-3-halopiperidine with a thiocarboxylic acid to form an N-substituted-3-thiocarboxyl piperidine and hydrolyzing said compound to produce an N-substituted-3-thiol piperidine. Such N-substituted-3-thiol piperidines may also be reacted, if desired, with acylating agents derived from carboxylic acids to produce the same or other N-substituted-3-thiocarboxyl piperidines. These processes may be illustrated as follows:

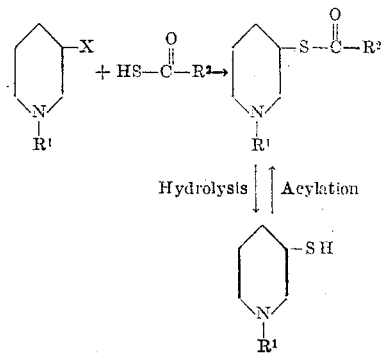

wherein $R^1$ represents an alkyl or aralkyl group, preferably of 8 carbons or less, $R^2$ represents an alkyl, alkenyl, aralkyl, aryl or heterocyclic group, preferably of 8 carbons or less, and X a halogen of the group consisting of bromine, chlorine and iodine.

The reaction of an N-substituted-3-halopiperidine and thiocarboxylic acid is conveniently effected under solvent conditions. Suitable organic solvents such as the lower alcohols like ethanol and isopropanol, benzene, chloroform and the like may be used. If desired, those thiocarboxylic acids which are liquid at room or elevated temperatures may be employed in excess in place of an added solvent. The reaction proceeds slowly at room temperature and accordingly elevated temperatures such as the reflux temperature are most suitable. The product is conveniently recovered after completion of the reaction by conventional methods such as removal of the solvent, extraction and fractional distillation.

Examples of reactants which may be used are: N-substituted-3-halopiperidines such as N-methyl-3-chloropiperidine, N-ethyl-3-bromopiperidine, N-benzyl-3-chloropiperidine, and N-phenylethyl-3-bromopiperidine; and thiocarboxylic acids such as thioacetic acid, thiopropionic acid, thiobutyric acid, thiobenzoic acid, thiophenylacetic acid and cycloalkylthiocarboxylic acids like cyclohexylthiocarboxylic acid and thioacrylic acid.

Specific N-substituted-3-thiocarboxyl piperidines which may be produced according to the described reaction are N-methyl-3-thioacetoxy piperidine, N-ethyl-3-thiopropoxy piperidine, N-ethyl-3-thiobenzoxy piperidine, N-(B-phenethyl)-3-thioacetoxy piperidine, N-ethyl-3-(p-nitrothiobenzoxy) piperidine, N-ethyl-3-diphenylthioacetoxy piperidine, N-ethyl-3-(p-aminothiobenzoxy)-piperidine and N-ethyl-3-phenylthioacetoxy piperidine.

Acid addition salts of these and other such compounds are produced by contacting the compound with a suitable acid such as a mineral acid like sulfuric acid or hydrochloric acid or organic acids like formic acid, citric acid and the like. Up to one mole of acid may be added to each mole of piperidine compound. Partial neutralization may be effected if desired. Quaternary ammonium salts of the N-substituted-3-thiocarboxyl piperidines are formed by reacting such compounds with alkyl esters of mineral and organic acids such as methyl chloride, ethyl bromide, methyl sulfate and equivalents thereto.

The N-substituted-3-thiocarboxyl piperidines produced above are converted to the corresponding N-substituted-3-thiolpiperidines by hydrolysis, preferably alkaline hydrolysis with a strong inorganic base such as an alkali metal hydroxide in aqueous solution. The hydrolysis proceeds to complete quickly at room temperature. Isolation of the resulting product may be effected by the usual methods.

Representative of the N-substituted-3-thiolpiperidines so produced are N-methyl-3-thiolpiperidine, N-ethyl-3-thiolpiperidine, N-benzyl-3-thiolpiperidine and N-phenylacetyl-3-thiolpiperidine. Acid addition and quaternary ammonium salts of these compounds are produced as indicated above in connection with the thioesters.

The N-substituted-3-thiolpiperidines so produced are convertible to thioesters by reacting the thiol with a suitable acylating agent. Some acylating agents suitable for this purpose that might be mentioned are carboxylic acid halides and anhydrides. Some specific acylating agents which may be used are acetyl chloride, propionyl chloride, benzoyl chloride, acetic acid anhydride, propionic acid anhydride, benzoic acid anhydride and phenylacetic acid anhydride. Inert solvents may be used for the reaction medium or liquid acylating agents such as the anhydrides may be employed in excess to form a suitable liquid reaction medium. The reaction proceeds at room temperature but elevated temperatures are preferred for completing the reaction more quickly. The product is isolated from the reaction mixture by conventional methods. By following this procedure N-substituted-3-thiocarboxyl piperidines such as those named hereinabove are produced.

The novel thioesters provided by this invention have anti-cholinergic activity and accordingly are useful against spasm of smooth muscle. Local anesthetic and sedative actions are also exerted by these compounds.

The following examples are added to illustrate specific methods of producing these compounds. It is understood, however, that the invention is not to be restricted to the disclosure of these examples.

EXAMPLE 1

N-ethyl-3-thioacetoxy piperidine

A mixture of 133 grams of N-ethyl-3-chloropiperidine, 69 gm. of thioacetic acid and 500 ml. of anhydrous isopropyl alcohol was refluxed for 15 hours. The isopropyl alcohol was removed by distillation under reduced pressure. The residue was dissolved in water and the aqueous solution made alkaline with aqueous potassium carbonate. The aqueous alkaline solution was extracted repeatedly with ether and the ether extracts combined and dried with potassium carbonate. The ether was removed by distillation and the residue distilled to give N-ethyl-3-thioacetoxy piperidine; B. P. 66° C. (0.35 mm.); $n_d^{20}$ 1.4963.

EXAMPLE 2

N-methyl-3-thioacetoxy piperidine

Equal molar quantities of N-methyl-3-chloropiperidine and thioacetic acid were reacted according to the procedure of Example 1 and the product, N-methyl-3-thioacetoxy piperidine recovered as therein described; B. P. 63–65° C. (0.9 mm.) $n_d^{20}$ 1.4947.

EXAMPLE 3

N-(B-phenethyl)-3-thioacetoxy piperidine

To 13.2 gm. of N-(B-phenethyl)-3-chloropiperidine in 50 ml. of isopropyl alcohol was added 4.6 gm. of thioacetic acid. The procedure of Example 1 was then followed and the N-(B-phenethyl)-3-thioacetoxy piperidine recovered; B. P. 130–136° C. (0.05 mm.).

EXAMPLE 4

N-ethyl-3-diphenylthioacetoxy piperidine hydrochloride

To a solution of 38 gm. of diphenylthioacetic acid in ethanol was added 9.3 gm. of potassium hydroxide dissolved in ethanol. To the resulting mixture was added 24.6 gm. of N-ethyl-3-chloropiperidine. The mixture was then heated at 50° C. for 5 hours, with stirring. The reaction mixture was cooled, filtered and the filtrate concentrated by distilling the solvent under reduced pressure. The residue was dissolved in 200 ml. of anhydrous ether. The ethereal solution was clarified by filtration and the filtrate acidified with ethereal hydrochloric acid. N-ethyl-3-diphenylthioacetoxy piperidine hydrochloride precipitated and was isolated by filtration; M. P. 105–120° C. On recrystallizing the product twice from methyl ethyl ketone, it melted at 126–128° C. (dec.).

EXAMPLE 5

N-ethyl-3-thiol piperidine and the hydrochloride thereof

To 160 ml. of 6% aqueous sodium hydroxide was added 85.3 gm. of N-ethyl-3-thioacetoxy piperidine with stirring and occasional cooling to maintain the mixture below 30° C. After stirring for 2 hours at 20° C., the mixture was neutralized with 94 gm. of acetic acid and saturated with 800 gm. of ammonium sulphate. The mixture was extracted repeatedly with ether and the ether extracts combined and dried with magnesium sulphate. The ether was removed by distillation and N-ethyl-3-thiol piperidine collected at 57° C. (1.65 mm.).

A sample of N-ethyl-3-thiol piperidine was added to acetone and the solution combined with ethereal hydrochloric acid. The hydrochloride salt was recovered by filtration; M. P. 179.5–180° C.

EXAMPLE 6

N-methyl-3-thiol piperidine and the hydrochloride salt thereof

To aqueous sodium hydroxide was added N-methyl-3-thioacetyl piperidine. The mixture was stirred for 2 hours below 30° C., acidified and extracted with ether. The ethereal extract was distilled to obtain N-methyl-3-thiol piperidine; B. P. 52–53° C. (8 mm.).

To 1 gm. of N-methyl-3-thiol piperidine in 20 ml. of acetone was added ethereal hydrochloric acid until the mixture was pH 2–3. A white crystalline precipitate of N-methyl-3-thiol piperidine hydrochloride formed and was isolated by filtration and dried; M. P. 120–121° C.

EXAMPLE 7

N-ethyl-3-(p-nitrothiobenzoxy) piperidine

To a solution of 11.7 gm. of N-ethyl-3-thiol piperidine in 25 ml. of toluene was added 14.8 gm. of p-nitrobenzoyl chloride in 50 ml. of toluene while stirring and cooling. After solution was effected the mixture was refluxed for ½ hour. The reaction mixture was cooled and N-ethyl-3-(p-nitrothiobenzoxy) piperidine precipitated. The product was filtered and recrystallized from isopropyl alcohol; M. P. 148.5–150.5° C.

EXAMPLE 8

N-ethyl-3-(p-aminothiobenzoxy) piperidine hydrochloride 7.8 gm. of N-ethyl-3-(p-nitrothiobenzoxy) piperidine hydrochloride was reduced in aqueous solution with hydrogen using Raney nickel as a catalyst. Room temperature and a hydrogen pressure of 60 p. s. i. gauge was employed. After the reduction was completed the catalyst was filtered and the filtrate reduced to dryness under reduced pressure. The product was triturated with acetone and filtered. The acetone was evaporated and the product recrystallized from isopropyl alcohol; M. P. 197–199° C.

Various changes and modifications of the invention can be made and, to the extent that such variations incorporate the spirit of this invention, they are intended to be included within the scope of the appended claims.

What is claimed is:
1. N-lower alkyl-3-lower alkyl thiocarboxy piperidine.
2. N-ethyl-3-thioacetoxy piperidine.
3. N-B-phenethyl-3-thioacetoxy piperidine.
4. N-ethyl-3-diphenylthioacetoxy piperidine.
5. N-ethyl-3-p-aminothiobenzoxy piperidine.
6. N-lower alkyl-3-thiol piperidine.
7. N-ethyl-3-thiol piperidine.
8. A member of the group consisting of compounds having the formula

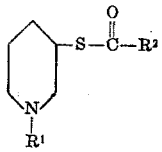

non-toxic acid addition salts thereof and non-toxic quaternary ammonium salts thereof, wherein $R^1$ is a member of the group consisting of lower alkyl groups and aralkyl groups in which the alkyl moiety is a lower alkyl and the aryl moiety is phenyl, and $R^2$ is a member of the group consisting of lower alkyl groups, lower alkenyl groups, phenyl, aralkyl groups in which the alkyl moiety is a lower alkyl group and in which the aryl moiety is phenyl, monocycloalkyl groups, and the benzohydryl group.

9. The process which comprises reacting a compound of the formula

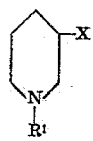

with a compound of the formula

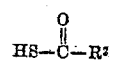

to produce a compound of the formula

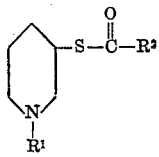

and hydrolyzing said compound to form a compound of the formula

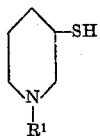

wherein X is a halogen of the group consisting of chlorine, bromine and iodine, R¹ is a member of the group consisting of lower alkyl groups and aralkyl groups in which the alkyl moiety is a lower alkyl and the aryl moiety is monocyclic, and R² is a member of the group consisting of lower alkyl groups, lower alkenyl groups, monocyclic aryl groups, monoheterocyclic groups, aralkyl groups in which the alkyl moiety is a lower alkyl group and in which the aryl moiety is monocyclic, monocycloalkyl groups, and aralkyl groups in which the alkyl moiety is a lower alkyl disubstituted with monocyclic aryl groups.

10. The process which comprises reacting a compound of the formula

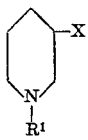

with a compound of the formula

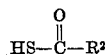

to produce a compound of the formula

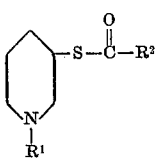

wherein X is a halogen of the group consisting of chlorine, bromine and iodine, R¹ is a member of the group consisting of lower alkyl groups and aralkyl groups in which the alkly moiety is a lower alkyl and the aryl moiety is phenyl, and R² is a member of the group consisting of lower alkyl groups, lower alkenyl groups, the phenyl group, aralkyl groups in which the alkyl moiety is a lower alkyl group and in which the aryl moiety is phenyl, monocycloalkyl groups, and the benzohydryl group.

11. The process which comprises reacting a compound of the formula

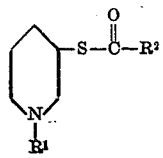

with a hydrolyzing agent to form a compound of the formula

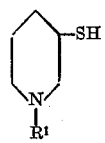

wherein R¹ is a member of the group consisting of lower alkyl groups and aralkyl groups in which the alkyl moiety is a lower alkyl and the aryl moiety is monocyclic, and R² is a member of the group consisting of lower alkyl groups, lower alkenyl groups, monocyclic aryl groups, monoheterocyclic groups, aralkyl groups, in which the alkyl moiety is a lower alkyl group and in which the aryl moiety is monocyclic, monocycloalkyl groups, and aralkyl groups in which the alkyl moiety is a lower alkyl disubstituted with monocyclic aryl groups.

12. The process which comprises reacting an N-ethyl-3-halopiperidine with thioacetic acid to form N-ethyl-3-thioacetoxy piperidine, the halogen substituent being a halogen other than fluorine.

13. The process which comprises reacting an N-(β-phenethyl)-3-halopiperidine with thioacetic acid to form N-(β-phenethyl)-3-thioacetoxy piperidine, the halogen substituent being a halogen other than fluorine.

14. The process which comprises reacting an N-ethyl-3-halopiperidine with diphenylthioacetic acid to form N-ethyl-3-diphenylthioacetoxy piperidine, the halogen substituent being a halogen other than fluorine.

15. The process which comprises reacting N-ethyl-3-thioacetoxy piperidine with a hydrolyzing agent to form N-ethyl-3-thiol piperidine.

16. The process which comprises reacting an N-lower alkyl-3-halopiperidine with a lower thiocarboxylic acid to form an N-lower alkyl-3-lower thiocarboxy piperidine, the halogen substituent being a halogen other than fluorine.

17. An N-lower alkyl-piperidine having in the 3 position of the piperidine nucleus a thiocarboxy group derived from a thiocarboxylic acid of not more than 8 carbons.

18. A member of the group consisting of compounds of the formula

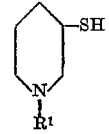

and nontoxic acid addition salts and nontoxic quaternary ammonium salts thereof, wherein R¹ is a member of the group consisting of lower alkyl groups and lower alkyl-phenyl groups.

References Cited in the file of this patent

UNITED STATES PATENTS

| | | |
|---|---|---|
| 2,642,433 | Duschinsky | June 16, 1953 |
| 2,745,837 | Papa | May 15, 1956 |

FOREIGN PATENTS

| | | |
|---|---|---|
| 598,390 | Great Britain | Feb. 17, 1948 |

OTHER REFERENCES

Chen et al.: Journal of Pharmacology and Experimental Therapeutics, vol. 104, pages 269–276, 1952.

Webster's New International Dictionary, 2nd ed., page 1194, 1939.

UNITED STATES PATENT OFFICE

CERTIFICATE OF CORRECTION

Patent No. 2,834,785                                               May 13, 1958

John H. Biel

It is hereby certified that error appears in the printed specification of the above numbered patent requiring correction and that the said Letters Patent should read as corrected below.

Column 2, line 37, for "complete" read -- completion --; column 4, line 37, beginning with "1. N-lower" strike out all to and including "piperidine.", same line, comprising claim 1; same column 4, line 63, beginning with "9. The process which" strike out all to and including "monocyclic aryl groups." in column 5, line 27, comprising claim 9; same column 5, line 60, beginning with "11. The process which" strike out all to and including "monocyclic aryl groups." in column 6, line 18, comprising claim 11; for the claims now appearing in the patent as numbers "2", "3", "4", "5", "6", "7", "8", "10", "12", "13", "14", "15", "16", "17", and "18", read -- 1, 2, 3, 4, 5, 6, 7, 8, 9, 10, 11, 12, 13, 14, and 15, respectively; in the heading to the printed specification, line 8, for "18 Claims" read -- 15 Claims --.

Signed and sealed this 19th day of August 1958.

(SEAL)
Attest:

KARL H. AXLINE                                                     ROBERT C. WATSON
Attesting Officer                                          Commissioner of Patents